United States Patent
Oh et al.

(10) Patent No.: US 11,267,530 B2
(45) Date of Patent: Mar. 8, 2022

(54) IN-WHEEL MOTOR DRIVING DEVICE AND MOVEMENT DEVICE INCLUDING SAME

(71) Applicant: LG ELECTRONICS INC., Seoul (KR)

(72) Inventors: Seung-Suk Oh, Seoul (KR); Eul Pyo Hong, Seoul (KR); Wondong Do, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/761,135

(22) PCT Filed: Oct. 24, 2018

(86) PCT No.: PCT/KR2018/012649
§ 371 (c)(1),
(2) Date: May 1, 2020

(87) PCT Pub. No.: WO2019/103325
PCT Pub. Date: May 31, 2019

(65) Prior Publication Data
US 2020/0269952 A1    Aug. 27, 2020

(30) Foreign Application Priority Data
Nov. 23, 2017 (KR) .......................... 10-2017-0157558

(51) Int. Cl.
*B62M 7/12* (2006.01)
*B62K 5/05* (2013.01)
*B62K 25/04* (2006.01)

(52) U.S. Cl.
CPC .................. *B62M 7/12* (2013.01); *B62K 5/05* (2013.01); *B62K 25/04* (2013.01); *B62K 2025/042* (2013.01)

(58) Field of Classification Search
CPC ............ B62M 7/12; B62K 5/05; B62K 25/04; B62K 2025/042; B62K 3/002;
(Continued)

(56) References Cited

U.S. PATENT DOCUMENTS

| 2,537,479 A   | * | 1/1951  | Motte  | ................... B60B 9/005  |
|               |   |         |        | 180/385                          |
| 6,364,078 B1  | * | 4/2002  | Parison | ................... B60G 3/01   |
|               |   |         |         | 188/380                         |
| 2004/0099455 A1 |   | 5/2004  | Nagaya  |                                |
| 2005/0247496 A1 | * | 11/2005 | Nagaya  | ................ B60K 7/0007   |
|               |   |         |         | 180/65.51                       |
| 2006/0048978 A1 | * | 3/2006  | Nagaya  | ................ B60K 7/0007   |
|               |   |         |         | 180/6.48                        |

(Continued)

FOREIGN PATENT DOCUMENTS

| JP | 2006-256401 A | 9/2006 |
| JP | 2007-186052 A | 7/2007 |

(Continued)

*Primary Examiner* — Darlene P Condra
(74) *Attorney, Agent, or Firm* — Dentons US LLP

(57) ABSTRACT

The present disclosure provides: an in-wheel motor driving device, which is improved so as to enable impact transmitted from the road during traveling to be buffered; and a movement device including the same. The in-wheel motor driving device, according to the present invention, comprises: a wheel including an in-wheel; an in-wheel motor provided inside the rim and rotating the rim; a supporting portion provided at the side surface of the in-wheel motor, and having the movement device connected at one side thereof; and a buffer provided between the in-wheel motor and the supporting portion so as to buffer the impact generated during vertical movement.

16 Claims, 5 Drawing Sheets

(58) Field of Classification Search
CPC ........ B62K 11/14; B62K 23/02; B60G 11/14; B60G 2204/124; B60K 7/00; B60K 7/0007; B60K 2007/0038
See application file for complete search history.

(56) References Cited

U.S. PATENT DOCUMENTS

| | | | | |
|---|---|---|---|---|
| 2007/0068715 | A1* | 3/2007 | Mizutani | B60K 7/0007 180/65.51 |
| 2007/0199750 | A1* | 8/2007 | Suzuki | B60K 7/0007 180/65.51 |
| 2008/0000706 | A1* | 1/2008 | Tashiro | F16D 3/04 180/202 |
| 2008/0185807 | A1* | 8/2008 | Takenaka | B60G 3/14 280/124.153 |
| 2008/0283314 | A1* | 11/2008 | Suzuki | H02K 15/14 180/65.51 |
| 2008/0283315 | A1* | 11/2008 | Suzuki | B60K 6/48 180/65.51 |
| 2011/0209938 | A1* | 9/2011 | Basadzishvili | B60K 7/0007 180/305 |

FOREIGN PATENT DOCUMENTS

| | | |
|---|---|---|
| KR | 10-0875004 B1 | 12/2008 |
| KR | 10-2010-0083521 A | 7/2010 |
| KR | 10-01127736 B1 | 3/2012 |
| KR | 10-2014-0006255 A | 1/2014 |
| KR | 10-2017-0103530 A | 9/2017 |

* cited by examiner (a)

(b)

(a)

(b)

IN-WHEEL MOTOR DRIVING DEVICE AND MOVEMENT DEVICE INCLUDING SAME

This application is a National Phase application of International Application No. PCT/KR2018/012649, filed Oct. 24, 2018, and claims the benefit of and priority to Korean Application No. 10-2017-0157558, filed on Nov. 23, 2017, all of which are hereby incorporated by reference in their entirety for all purposes as if fully set forth herein.

TECHNICAL FIELD

The present disclosure relates to an in-wheel motor driving device in which a motor is included in an inner portion of a wheel and a movement device including the same, and also relates to the in-wheel motor driving device having impact absorbing function and the movement device including the same.

BACKGROUND ART

Generally, as urbanization is proceeded, a range and an amount of activities increase. Accordingly, a substitute movement device for conveniently moving in a short distance is needed and leisure culture using the movement device is also developed.

As an example of the substitute movement device, the movement device such as a so-called quick board is developed and used. The quick board includes a frame having a footboard, on which a user may step and stand wherein wheels are installed onto front and rear portions of the frame. The quick board further includes a steering portion connecting with a front wheel to control a direction and a steering handle connected with both sides of the steering portion.

The quick board has a small size and a light weight, so that men and women of all ages may utilize the quick board. Recently, foldable function is added thereto, so that there is an advantage in that movement or storage is convenient.

Meanwhile, a conventional quick board is moved by stamping a user's foot. However, as technology is developed, a motor driving-type quick board in which a motor is equipped is developed and used. Recently, use of an electric quick board having an in-wheel motor driving device in which the motor is equipped in an inner portion of a wheel to rotate the wheel increases.

A conventional electric quick board has a structure wherein a shock absorber is installed onto a portion of a front wheel connected with a direction control rod to absorb an impact, but an additional buffer device may not be installed onto a rear wheel due to a motor etc. equipped for driving.

Therefore, the conventional electric quick board may not effectively absorb an impact etc. transferred from a road during a drive, so that it is a main factor in that the user may easily feel fatigue. Particularly, a rear wheel in which an in-wheel motor driving device is equipped may not absorb an impact transferred from a road, so that it is a main factor from which a breakdown is resulted.

Meanwhile, a conventional electric quick board is mostly configured to have two wheels. Recently, a three-wheel electric quick board in which a safe drive is possible and a risk of an overturning etc. is low is developed wherein the front wheel has two wheels and the rear wheel has one wheel.

This electric quick board in which an in-wheel motor driving device is coupled to the front wheel may be electrically operated, but it is difficult to install a buffer device such as a shock absorber etc. onto the front wheel. Therefore, there is a need for developing an in-wheel motor driving device to buffer an impact.

DISCLOSURE

Technical Problem

According to an exemplary implementation, an improved in-wheel motor driving device to buffer an impact transferred from a road during a drive and a movement device including the same may be provided.

Technical Solution

According to an exemplary implementation, an in-wheel motor driving device includes a wheel 20 including an in-wheel 22, an in-wheel motor 30 provided inside the in-wheel 22 and rotating the in-wheel 22, a supporting portion 40 connecting the in-wheel motor 30 and a movement device 100, and a buffer unit 50 provided between the in-wheel motor 30 and the movement device 100 so as to buffer an impact generated during vertical movement.

A first side of the supporting portion 40 is installed on the in-wheel motor 30, and a second side thereof is installed on the movement device 100 wherein the first and second sides of the supporting portion 40 are relatively movable in a vertical direction with respect to each other.

A first side of the buffer unit 50 may be supported by the in-wheel motor 30 or by the first side of the supporting portion 40 fixed to the in-wheel motor 30, and a second side of the buffer unit 50 may be supported by the movement device 100 or by the second side of the supporting portion 40 fixed to the movement device 100.

The supporting portion 40 includes a guide bar 44 that is installed on any one side of a side surface of the in-wheel motor 30 or the movement device 100, that is extended in a certain length in a vertical direction, and upper and lower ends of which are fixed to the one side, and a guide block 46 that is provided to the other side of the side surface of the in-wheel motor 30 or 100, that is coupled to be slidingly movable in a vertical direction to the guide bar 44.

The guide bar 44 or the guide block 46 connected to the movement device 100 may be connected to the movement device 100 in such a way that the guide bar 44 or the guide block 46 is fixed to a guide frame 42 and the guide frame 42 is fixed to the movement device 100.

A pair of guide bars 44 is included in parallel, and the buffer unit 50 is disposed between the pair of the guide bars 44.

A pair of guide bars 44 is included in parallel, a first extension portion that is horizontally extended is included in any one side of upper or lower portions of the pair of guide bars 44, a second extension portion that is horizontally extended is included in the other side of upper and lower portions of the guide block 46, a first end of the buffer unit 50 is supported by the first extension portion, and a second side of the buffer unit 50 is supported by the second extension portion.

The buffer unit 50 may comprise at least any one of a compression coil spring or a shock absorber.

The in-wheel 22 may include a rim 22b which has a ring shape and outer circumference of which a tire 24 is coupled to; and a protrusion 22a that is inwardly extended in an axial direction from the rim 22b, and wherein the supporting portion 40 may be inwardly disposed in a radial direction of the protrusion 22a.

The in-wheel motor 30 includes an outer circumferential shaft 36b which has a cylinder shape and faces inner circumference of the protrusion 22a; a shaft 36a which is extended in an axial direction at a center of a radial direction of the outer circumferential shaft 36b; and a circular plate 36c connecting the shaft 36a and the outer circumferential shaft 36b. The supporting portion 40 is inwardly disposed in a radial direction of the outer circumferential shaft 36b.

According to another exemplary implementation, a movement device may include a frame having a footboard, a pair of in-wheel motor driving devices provided onto both sides of the front portion of the frame, and at least one rear wheel provided onto the rear portion of the frame.

Also, the frame may include a steering portion extended and installed onto the upper portion of the front portion and a steering handle that extends to both sides of the steering portion and has a control portion controlling operation of the in-wheel motor driving device.

Advantageous Effects

According to the present disclosure, a buffer unit buffering an impact of the in-wheel motor driving device is integrally equipped to effectively cushion an impact transferred from a road and to overcome limitation of installation space for installing an additional buffer means. Accordingly, an overall structure of the movement device having the in-wheel motor driving device may be simplified.

Figure 2:
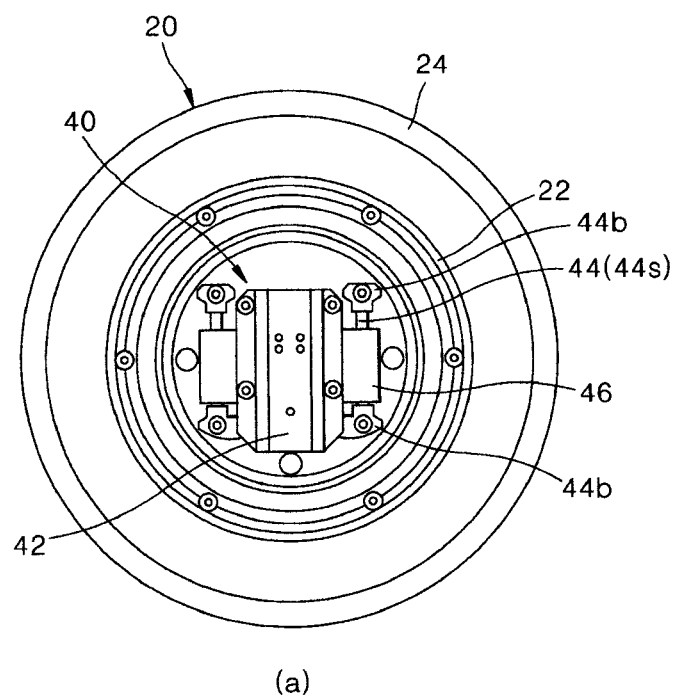
Figure 2:
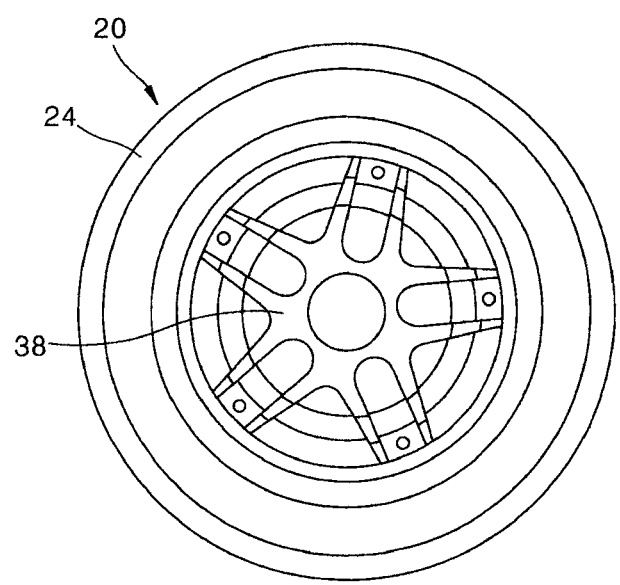

(a) and (b) of FIG. 2 are a side view of an in-wheel motor driving device according to one exemplary implementation of the present disclosure.

Figure 3:
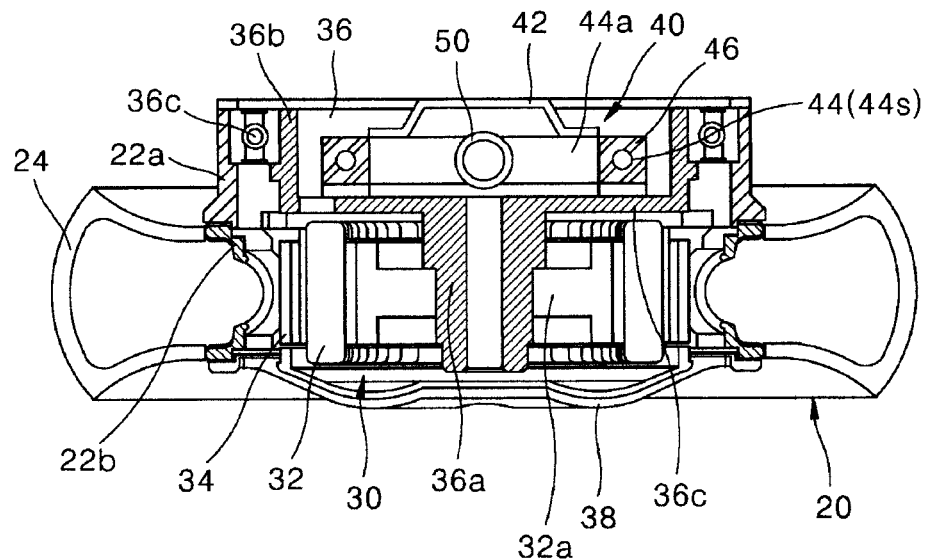
Figure 3:
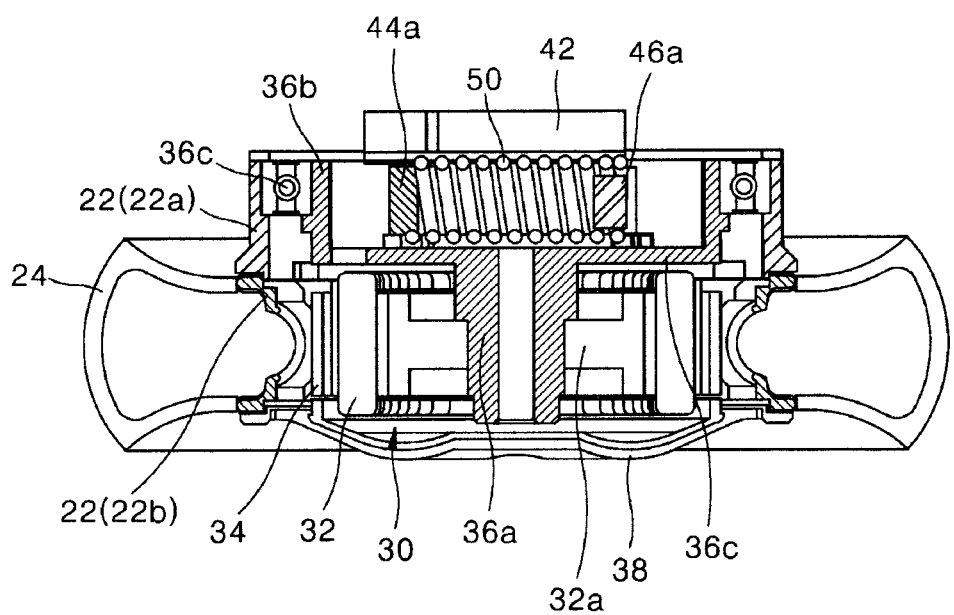

FIG. 3 is a sectional view of an in-wheel motor driving device according to one exemplary implementation of the present disclosure.

Figure 4:
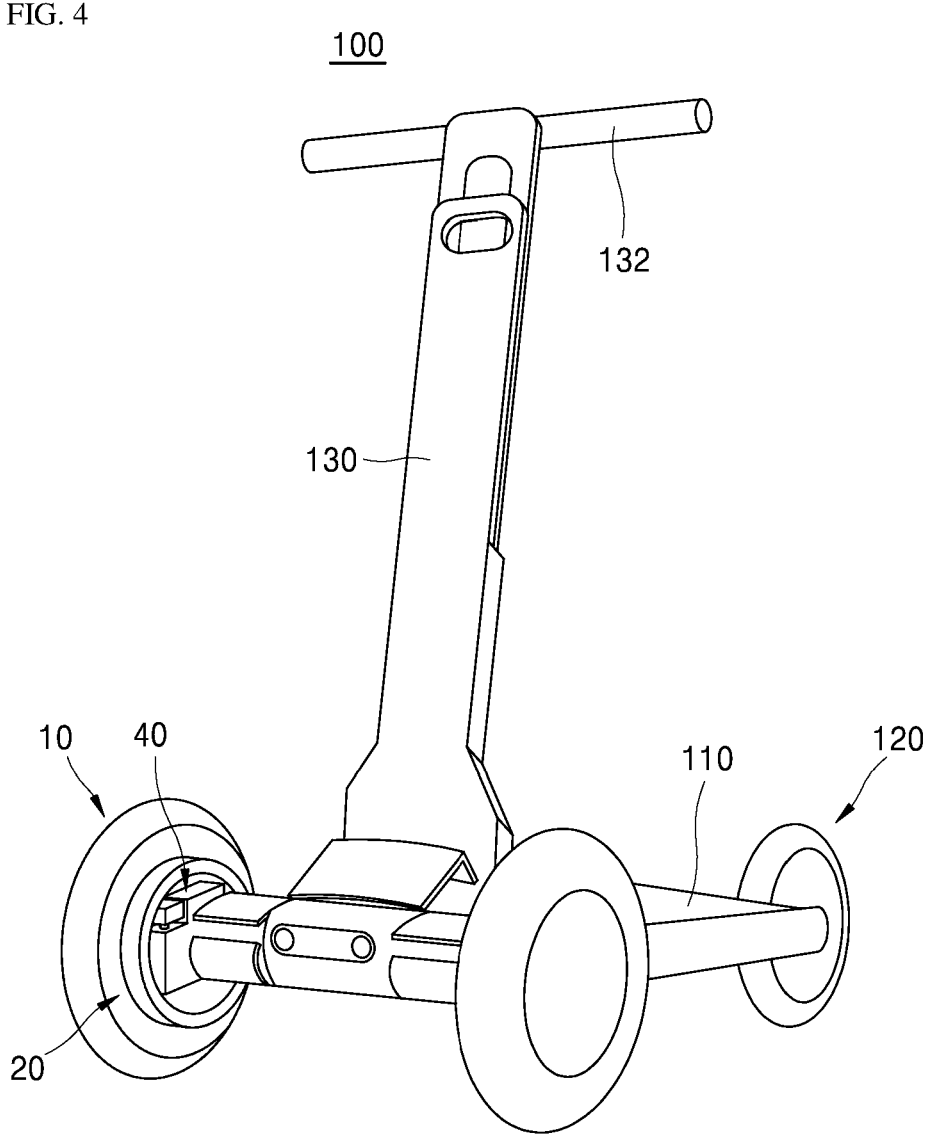

FIG. 4 is a perspective view of a movement device including an in-wheel motor driving device according to one exemplary implementation of the present disclosure.

Figure 5:
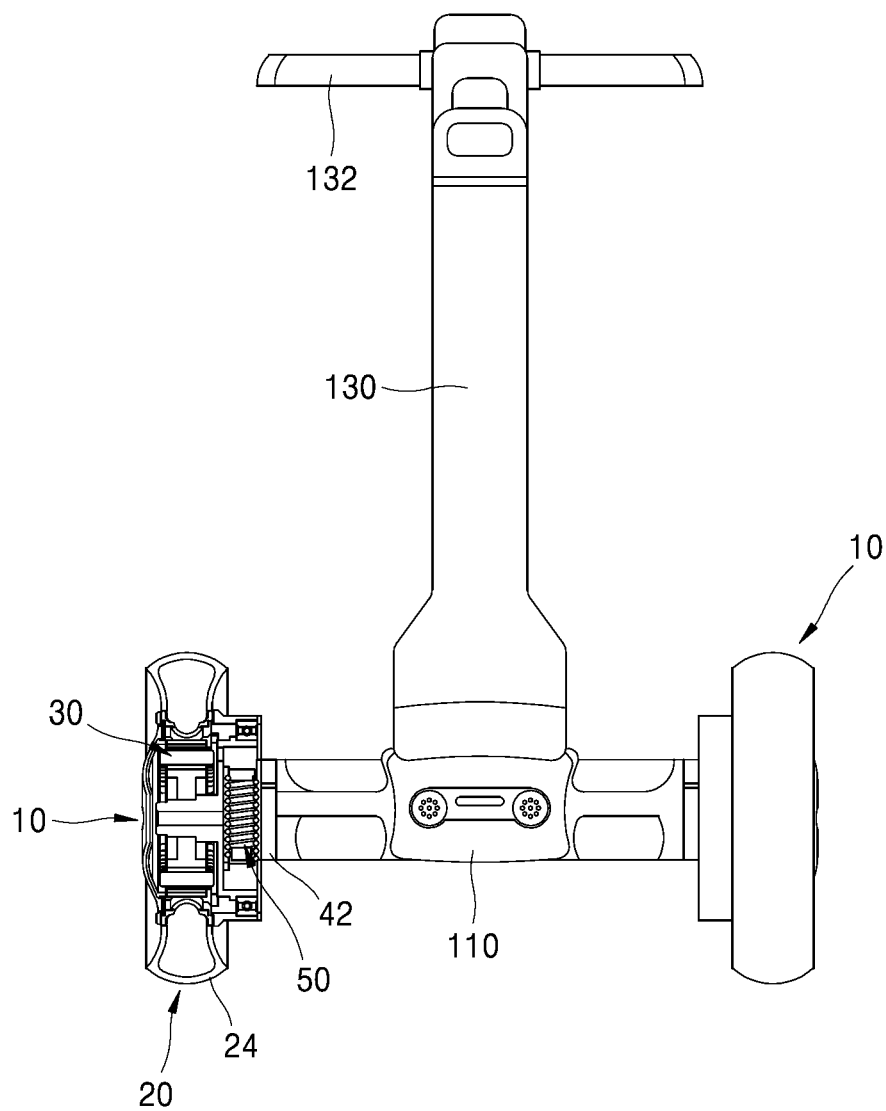

FIG. 5 is a front view of a movement device including an in-wheel motor driving device according to one exemplary implementation of the present disclosure.

DESCRIPTION OF REFERENCE NUMERALS OF MAIN PART IN FIGURES

10: In-wheel motor driving device
20: Wheel
22: In-wheel
22a: Protrusion
22b: Rim
30: In-wheel motor
32: Stator
32a: Yoke
34: Rotor
36: Shaft casing
36a: Shaft
36b: Outer circumferential shaft
36c: Circular plate
38: Cover
40: Supporting portion
42: Guide frame
44: Guide bar
44a: Lower extension member
44b: Block
44s: Bar
46: Guide block
46a: Upper extension member
50: Buffer unit
100: Movement device

BEST MODE

Implementations described in this specification and configuration shown in figures are merely the most preferable one implementation of the present disclosure and are not representative for all of technical sprits of the present disclosure. Accordingly, it should be understood that there may be various equivalents and modifications substituting for the above at the time of filing the present application. Also, terms to be described later are defined considering function in the present disclosure, so that the terms may be varied according to intent of a user or an operator, or practices. Therefore, definition about these terms may be defined by the overall content of the present specification.

Hereinafter, a motor for high speed rotation according to an exemplary implementation of the present disclosure is described.

Figure 1:
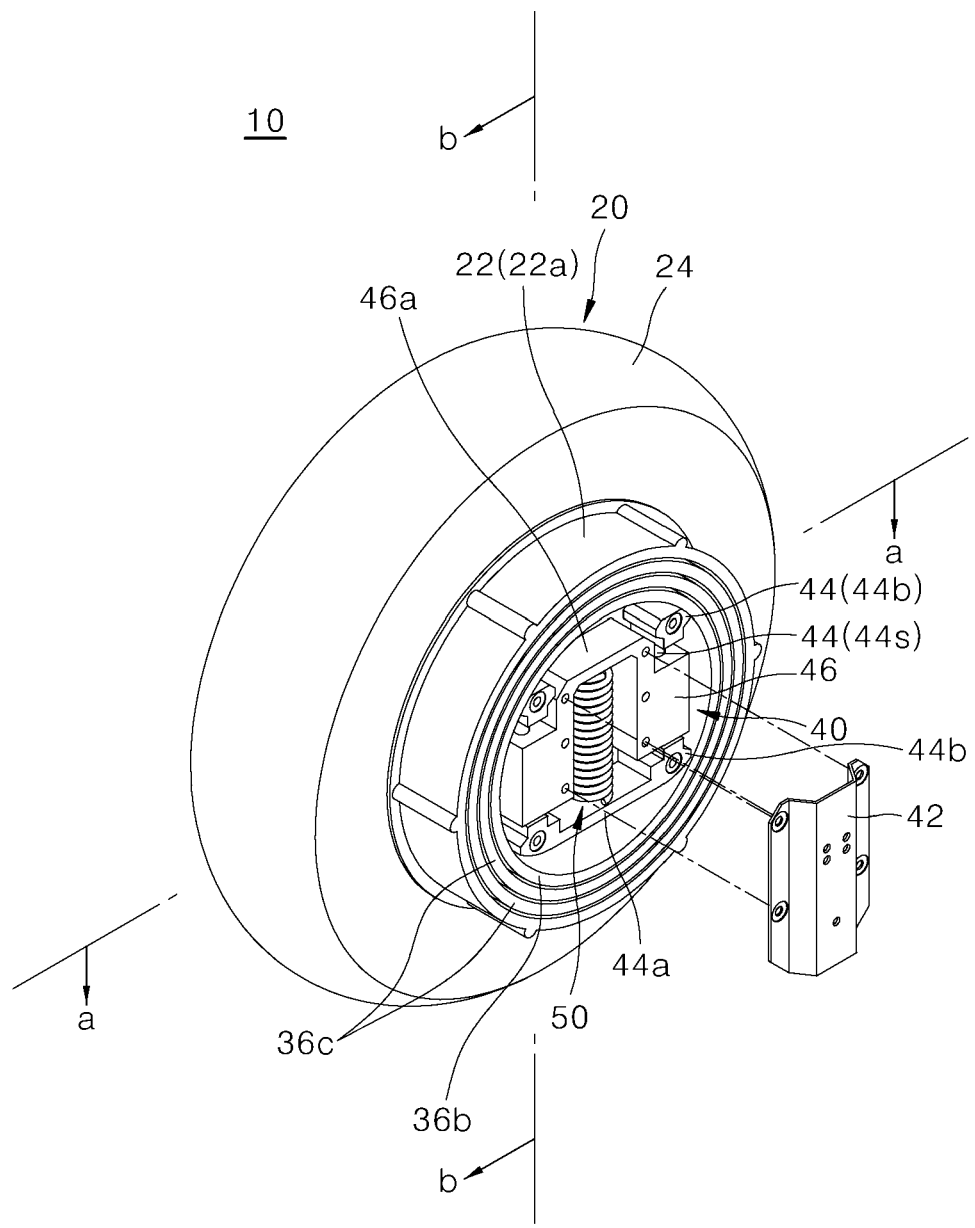
FIG. 1 is a perspective view of an in-wheel motor driving device according to one exemplary implementation of the present disclosure.

FIG. 1 is a perspective view of an in-wheel motor driving device according to one exemplary implementation of the present disclosure. (a) and (b) of FIG. 2 are an inner side view and an outer side view of an in-wheel motor driving device according to one exemplary implementation of the present disclosure. FIG. 3 is a sectional view of an in-wheel motor driving device according to one exemplary implementation of the present disclosure.

The in-wheel motor driving device according to an exemplary implementation of the present disclosure may be equipped onto the front wheel or the rear wheel of the movement device to provide a driving force. In the exemplary implementation, a structure in that a pair of in-wheel motor driving devices is installed onto right and left of the front of the movement device is disclosed.

Referring to FIGS. 1 to 3, an in-wheel motor driving device 10 of an exemplary implementation of the present disclosure may include a wheel 20, an in-wheel motor 30, a supporting portion 40, and a buffer unit 50.

A wheel 20 provided to the in-wheel motor driving device 10 may include an in-wheel 22 formed as a circular ring shape and providing rigidity and a tire 24 installed onto the in-wheel 22.

A wheel may be manufactured by a metal such as steel or aluminum alloy. The in-wheel 22 may include a rim 22b and a protrusion 22a of a cylindrical shape provided in an inner side in a rotation axial direction from the rim. The rim 22b and the protrusion 22a may be integrally processed or may be assembled after respectively processing to be fixed to each other.

The tire 24 is coupled to outer circumference of the in-wheel 22 to be capable of contacting a road. Specifically, the tire 24 may be installed onto outer circumference in a radial direction of the rim 22b. As the tire 24, an integrated tire 24 of which the inner portion is filled or a tube-type or tubeless tire 24 filled with air therein may be used.

The in-wheel motor 30 providing a driving force rotating the in-wheel 22 in the inside in a radial direction of the in-wheel 22 of the wheel may be provided.

The in-wheel motor 30 may include a shaft casing 36, a stator 32 installed onto the shaft casing 36, and a rotor 35 installed onto the in-wheel 22.

The shaft casing 36 may be fixed to the movement device to be shock-absorbable through the supporting portion 40 and the buffer unit 50 that are described later. The shaft casing 36 may include an outer circumferential shaft 36b of a cylindrical shape and a shaft 36a extended in an axial direction at a center of a radial direction of the outer circumferential shaft 36b. The outer circumferential shaft 36b and the shaft 36a are connected with each other by a circular plate 36c. The outer circumferential shaft 36b and the shaft 36a are extended in an opposite direction from the circular plate 36c. The outer circumferential shaft 36b and the circular plate 36c forms a bowl shape, so that the inner space defined thereby is provided. The outer circumferential shaft 36b is accommodated inside in a radial direction of the protrusion 22a of the wheel, and the shaft 36a is accommodated inside in a radial direction of the rim 22b of the wheel. With respect to the shaft casing 36, the in-wheel 22 may be supported and installed by a bearing 36c to be rotatable. The bearing 36c may be installed between the outer circumferential shaft 36b and the protrusion 22a.

The in-wheel motor 30 may include a stator 32 at a center that is divided numerously and is located circularly. The stator is installed onto outer circumference of the shaft 36a wherein a yoke 32a is located therebetween. A rotor 34 is installed outside in a radial direction of the stator 32 in a certain gap with respect to the stator 32. The rotor 34 is installed along the inner circumference of the rim 22b.

The stator 32 may include a core in which a plurality of poles are formed and the core may be provided in a form in that the coil is wound to each of the poles. An electromagnetic force may occur at the coil and the pole of the stator 32 due to supply of current.

The rotor 34 may include a permanent magnet or may include the permanent magnet and the core. The rotor 34 may be rotated by attraction or repulsion generated in the permanent magnet with respect to the electromagnetic force generated from the stator 32. The rotor 34 is fixedly installed onto the in-wheel of the wheel, specifically the rim 22b, to rotate the in-wheel 22 with a rotation force generated by a current provided to the stator 32.

That is, by electromagnetic interaction of the stator 32 and the rotor 34, the rotor 34 rotates around the stator 32, so that the rim 22b, that is, the in-wheel 22 rotates around the shaft casing 36. That is, the in-wheel motor may have an outer rotor structure.

The shaft casing 36 supports the stator 32 and rotatably supports the rotor 34 and the in-wheel 22. The shaft casing 36 may be provided to the in-wheel motor 30 in an inner side in an axial direction of the in-wheel motor driving device 10. Also, a cover 38 covering the stator and the rotor which are the internal components of the in-wheel motor 30 may be located in an opposite side in an axial direction of the shaft casing 36 of the in-wheel motor 30. The cover 38 may hide the stator and the rotor from an outside and be coupled to the rim 22b. That is, the cover 38 may rotate with the rim 22b.

The shaft 36a of the shaft casing 36 fixedly supports the inner circumference of the stator 32 and outer circumferential shaft 36b rotatably supports the protrusion 22a of the in-wheel 22. Further, the rotor 34 is installed onto the inner circumference of the rim 22b of the wheel.

The supporting portion 40 may be provided to an inner side in an axial direction of the in-wheel motor 30. Specifically, the supporting portion may be located in the inner space defined by the outer circumferential shaft 36b and the circular plate 36c. Accordingly, the supporting portion 40 may not be exposed to the outside.

A first side of the supporting portion 40 may be installed on the in-wheel motor 30 and a second side thereof may be installed on the movement device 100. Specifically, the first side of the supporting portion 40 may be fixed to the circular plate 36c of the in-wheel motor 30 and the second side thereof may be installed onto the frame of the movement device 100. The first and second sides of the supporting portion 40 may be relatively movable in a vertical direction with respect to each other.

The supporting portion 40 may be installed through a bracket etc. on the front portion of the frame of the movement device.

Here, the bracket provided between the supporting portion 40 and the front portion of the frame is configured such that an angle may be controlled upon inclining the frame. Accordingly, the movement device's direction may be controlled. Steering of the movement device having the above steering structure is possible only when the frame is inclined in a right or left direction, so that chance to be overturned by inclination of a centrifugal force may be minimized.

The supporting portion 40 may connect the in-wheel motor 30 and the frame of the movement device 100 and accommodate the buffer unit 50 for absorbing and buffering an impact in order that the impact of the wheel 200 applied by the outside is not directly transferred to the movement device 100. The impact of the wheel 20 applied by the outside may occur due to an uneven road and mainly occur in a vertical direction.

The supporting portion 40 may be provided with the buffer unit 50. A first side of the buffer unit 50 may be supported by the in-wheel motor 30 or by the first side of the supporting portion 40 fixed to the in-wheel motor 30. A second side of the buffer unit 50 may be supported by the movement device 100 or by the second side of the supporting portion 40 fixed to the movement device 100.

Specifically, the supporting portion 40 may include a guide bar 44, a guide block 46, and a guide frame 42.

The guide bar 44 may be installed onto the side surface of the in-wheel motor 30 and may be extended in a certain length in a vertical direction. An upper and lower ends of the guide bar 44 may be fixed to a circular plate 36c of the in-wheel motor 30, respectively. A pair of guide bars 44 may be provided in parallel to the circular plate 36c. The upper and lower ends of the guide bar 44 may have thick blocks 44b shapes respectively, and may be fixed to the side surface of the in-wheel motor 30 by a bolt etc. Two blocks 44b respectively fixed at the upper portion and lower portion are mutually connected by a bar 44s of a cylindrical shape. The blocks 44b and the bar 44s may be integrally manufactured or may be assembled and fixed after manufacturing respectively.

The guide block 46 may engage with the guide bar 44 and be slidingly movable in a vertical direction. A hole into which the bar 44s of the guide bar 44 is inserted may be extended in a vertical direction and formed through the guide block 46. The hole may be provided onto both sides of the guide block 46, respectively. The guide block 46 may be movable in a vertical direction according to the bar 44s between the blocks 44b provided at the upper and lower ends of the guide bar 44.

In the inner portion of the hole in that the guide block 46 comes into contact with the bar 44s, a friction reduction member such as a linear bearing or a bushing etc. may be provided. Accordingly, it is possible that the guide block 46 is movable in a vertical direction with little or almost no friction in a state coupled to the guide bar 44.

The guide frame 42 may be fixed to the guide block 46. Further, the guide frame 42 may be fixed to the frame of the movement device 100. The guide frame 42 may be fixed to the bracket provided at the frame of the movement device 100. The guide frame 42 may have a form ensuring space in that the buffer unit 50 is accommodated. That is, both sides of the guide frame 42 may have protruded shapes in a direction to the guide block to engage with the guide block 46 wherein the center portion thereof may have a depressed shape to ensure space in that the buffer unit 50 may be accommodated.

In an exemplary implementation, a structure in that the guide bar 44 of the supporting portion 40 is installed at the in-wheel motor 30 and the guide block 46 of the supporting portion 40 is installed at the frame of the movement device 100 is disclosed. However, the guide bar 44 may be installed at the frame of the movement device 100 and the guide block 46 may be installed at the in-wheel motor. Also, in an exemplary implementation, a structure in that the guide block 46 is installed onto the guide frame 42 is disclosed, but the guide bar 44 may be installed onto the guide frame 42. Also, in an exemplary implementation, a structure in that the guide frame 42 is connected with the frame of the movement device 100 is disclosed, but the guide frame 42 may be installed at the in-wheel motor. That is, if a structure is that the guide bar 44 and the guide block 46 are fixed to any one side and the other side of the in-wheel motor 30 and the frame of the movement device 100 respectively and the guide bar 44 and the guide block 46 are movably connected with little or no friction in a vertical direction, the structure may be modified in various forms.

In an exemplary implementation, the buffer unit 50 may buffer an impact transferred from a road to the movement device through the wheel 20. For the above, the buffer unit 50 may include at least any one of a spring having elasticity or a shock absorber for absorbing an impact transferred from the road. The shock absorber may be installed in the inside of the spring of a coil shape.

The lower ends of a pair of guide bars 44 may be extended in a lateral direction and both ends thereof may be connected by a lower extension member 44a connected with the blocks 44b respectively. Also, at an upper end of the guide block 46, an upper extension member 46a of which both ends are connected to upper portions of block shapes provided onto both sides of the guide block 46 may be included. That is, the guide bar 44 and the lower extension member 44a may form a shape of "U" in overall, and the guide block 46 and the upper extension portion 46a also form a shape of "∩" wherein the above two "U" and "∩" structures may be opposite to and face each other. The buffer unit 50 may be installed in space of "□" shape defined accordingly.

A lower end of the spring of the buffer unit 50 and/or a lower end of the shock absorber of the buffer unit 50 may be supported by the lower extension member 44a, and an upper end thereof may be supported by the upper extension member 46a.

The upper extension member 46a and the lower extension member 44a repeat to be close to and be far away from each other as the wheel is affected by the impact applied from the road. Here, the buffer unit 50 located between the upper extension member 46a and the lower extension member 44a may buffer the impact while the guide block 46 ascends and descends along the guide bar 44. A boss shape (refer to FIG. 3 (b)) to prevent deviation of the spring and to connect the shock absorber may be included in each of the upper extension member 46a and the lower extension member 44a.

According to an exemplary implementation, a structure in that the upper extension member 46a is provided in the guide block 46 and a lower extension member 44a is provided in the guide bar 44 is disclosed. However, it is possible that the upper extension member is prepared in the guide bar and the lower extension member is prepared in the guide block.

The guide frame 42 connected to the movement device is connected to the guide block 46. As the tire 24 moves in a vertical direction due to unevenness of the road etc., the in-wheel 22 and the in-wheel motor 30 move together due to the above movement. However, the movement is buffered by the supporting portion 40 and the buffer unit 50 and is transferred to the movement device 100. That is, the buffer unit 50 absorbs an impact when the impact transferred from the road is transferred to the movement device 100 through the wheel 20.

FIG. 4 is a perspective view of a movement device including an in-wheel motor driving device according to one exemplary implementation of the present disclosure, and FIG. 5 is a front view of a movement device including an in-wheel motor driving device according to one exemplary implementation of the present disclosure.

The in-wheel motor driving device 10 configured as pre-described may be installed in various movement devices to provide a driving force.

As one example of the movement device 100, a quick board is representatively utilized.

The movement device 100, for example, a quick board, may include a frame 110 having a foothold.

Also, the in-wheel motor driving device 10 may be provided to both sides of the front portion of the frame 110 so as to provide a driving force. The in-wheel motor driving device 10 may be coupled to the frame 110 without an additional rotation axis since the wheel including the in-wheel 22 is provided for rotating.

Specifically, the in-wheel motor driving device 10 may include the wheel 20 including the in-wheel 22 and the in-wheel motor 30 that is provided to the inner portion of the in-wheel 22, directly rotates the in-wheel 22 to generate a driving force.

The supporting portion 40 connected to both sides of the front portion of the frame 110 may be installed at a side of the in-wheel motor 30 to be movable in a vertical direction.

The guide bar 44 extended in a vertical direction may be installed onto both lateral portions of the side of the in-wheel motor 30, the guide frame 42 is installed onto the guide block 46 that is coupled to the guide bar 44 and moves in a vertical direction, and the guide frame 42 may be fixed to the frame 110.

Meanwhile, the buffer unit 50 may be provided between the in-wheel motor 30 and the frame 110 so as to buffer the impact transferred from the road. The buffer unit 50 may be provided to the supporting portion 40.

The buffer unit 50 may include the spring or the shock absorber, wherein a first end thereof may be connected to the in-wheel motor 30 (according to an exemplary implementation, the guide bar of the supporting portion), and the second end thereof may be connected to the frame 110 (according to an exemplary implementation, the guide block of the supporting portion). The buffer unit 50 may absorb the impact transferred from the road through the wheel 20, so that it may be prevented that the impact is transferred to the frame 110 through the supporting portion 40.

Meanwhile, the rear wheel 120 may be provided at a center portion of the rear end of the frame 110.

As a pair of the in-wheel motor driving devices 10 provided to both sides of the front portion of the frame 110 is operated, the movement device 100 pre-described may be driven. Also, the movement device 100 may steer a driving direction by inclining the frame 110 in a right or left direction.

That is, in a state in that the user rides on the frame 110, if a body is inclined in a right or left direction, the in-wheel motor driving device 10 may be inclined for the frame to change a direction. Here, the frame 110 slants in order that the body of the user is inclined in an opposite direction against a direction in that a centrifugal force acts. Accordingly, it is possible to steer the movement device 100 in a state of being not overturned by the centrifugal force.

Meanwhile, a steering portion 130 extended in an upper direction on the front portion of the frame 110 and a steering handle 132 extended to both sides of the steering portion 130 may be provided to the movement device 100 in order that the user may grab.

In addition, a controller controlling operation of the in-wheel motor driving device 10 may be included in the steering handle 132. Also, besides the controller of the in-wheel motor driving device 10, a break lever, an alarm device, lighting and so on may be installed in the steering handle 132. Also, a display device for displaying an operation state may be provided to the controller, and besides the above, a charging state, and a lighting state may be displayed.

Meanwhile, according to an exemplary implementation, a charging device for providing power to the in-wheel motor driving device 10 may be provided to the inner portion of the frame 110, or may be provided to the inner portion of the steering portion 130. Besides, it is possible to be additionally provided and to be detachably provided to a first side of the movement device 100.

Further, the steering portion 130 may be preferably provided in a structure to be foldable with respect to the frame 110, so that volume may be reduced upon storing or moving.

As the above, the present disclosure was explained referring to an exemplary implementation shown in drawings, but it may be understood that the above is provided only as examples wherein various modifications and equivalent other exemplary implementations may be made by one having ordinary skill in the art based on the above. Thus, the actual technical scoop of the present disclosure to be protected should be defined according to the appended claims.

The invention claimed is:

1. An in-wheel motor driving device for a movement device, comprising:
   a wheel including an in-wheel;
   an in-wheel motor provided inside the in-wheel and rotating the in-wheel;
   a supporting portion connecting the in-wheel motor and the movement device; and
   a buffer provided between the in-wheel motor and the movement device so as to buffer an impact generated during vertical movement,
   wherein the supporting portion comprises:
      a guide bar that is installed on any one of a side of the in-wheel motor or the movement device and is extended in a certain length in a vertical direction, wherein upper and lower ends of the guide bar are fixed to the one of a side of the in-wheel motor or the movement device, and
      a guide block that is provided to the other of the side of the in-wheel motor or the movement device and is coupled to be to the guide bar slidingly movable in a vertical direction, and
      wherein a pair of guide bars is provided in parallel, and any one of upper portions or lower portions of the pair of guide bars include a first extension member that is horizontally extended, and
   wherein the other of upper portion and lower portion of the guide block includes a second extension member that is horizontally extended, the first extension member supports a first end of the buffer and the second extension member supports a second end of the buffer.

2. The in-wheel motor driving device of claim 1, wherein a first side of the supporting portion is installed at the in-wheel motor, and a second side thereof is installed at the movement device, and
   wherein the first and second sides of the supporting portion are relatively movable in a vertical direction with respect to each other.

3. The in-wheel motor driving device of claim 2, wherein a first side of the buffer is supported by the in-wheel motor or by the first side of the supporting portion fixed to the in-wheel motor, and a second side of the buffer is supported by the movement device or by the second side of the supporting portion fixed to the movement device.

4. The in-wheel motor driving device of claim 1, wherein the guide bar or the guide block is connected to the movement device in such a way that the guide bar or the guide block is fixed to a guide frame and the guide frame is fixed to the movement device.

5. The in-wheel motor driving device of claim 1, wherein a pair of the guide bars is provided in parallel, and the buffer is disposed between the pair of the guide bars.

6. The in-wheel motor driving device of claim 1, wherein the buffer comprises a compression coil spring and/or a shock absorber.

7. The in-wheel motor driving device of claim 1, wherein the in-wheel comprises:
   a rim which has a ring shape and outer circumference of which a tire is coupled to; and
   a protrusion that is inwardly extended in an axial direction from the rim,
   wherein the supporting portion is inwardly disposed in a radial direction of the protrusion.

8. The in-wheel motor driving device of claim 7, wherein the in-wheel motor comprises:
   an outer circumferential shaft which has a cylinder shape and faces inner circumference of the protrusion;
   a shaft which is extended in an axial direction at a center of a radial direction of the outer circumferential shaft; and
   a circular plate connecting the shaft and the outer circumferential shaft,
   wherein the supporting portion is inwardly disposed in a radial direction of the outer circumferential shaft.

9. The in-wheel motor driving device of claim 1, wherein guide bars and the first extension member forms a shape of "U" in overall, and the guide block and the second extension portion also form a shape of "U".

10. The in-wheel motor driving device of claim 9, wherein the two "U" structures are opposite and face each other to form a "☐" shape.

11. The in-wheel motor driving device of claim 10, wherein the buffer is installed in space of the "☐" shape.

12. A movement device comprising:
a frame having a foothold; and
an in-wheel motor driving device to provide a driving force, wherein the in-wheel motor driving device comprising:
   a wheel including an in-wheel;
   an in-wheel motor provided inside the in-wheel and rotating the in-wheel;
   a supporting portion connecting the in-wheel motor and the movement device; and
   a buffer provided between the in-wheel motor and the movement device so as to buffer an impact generated during vertical movement,
wherein the supporting portion comprises:
a guide bar that is installed on any one of a side of the in-wheel motor or the movement device and is extended in a certain length in a vertical direction, wherein upper and lower ends of the guide bar are fixed to the one of a side of the in-wheel motor or the movement device, and
a guide block that is provided to the other of the side of the in-wheel motor or the movement device and is coupled to be to the guide bar slidingly movable in a vertical direction, and
wherein a pair of guide bars is provided in parallel, and any one of upper portions or lower portions of the pair of guide bars include a first extension member that is horizontally extended, and
wherein the other of upper portion and lower portion of the guide block includes a second extension member that is horizontally extended, the first extension member supports a first end of the buffer and the second extension member supports a second end of the buffer.

13. The movement device of claim 12, wherein one of a pair of the in-wheel motor driving devices is provided to one side of the front portion of the frame, and another one of the pair of the in-wheel motor driving devices is provided to other side of the front portion of the frame.

14. The movement device of claim 12, wherein a first side of the supporting portion is installed at the in-wheel motor, and a second side thereof is installed at the frame, and
   wherein the first and second sides of the supporting portion are relatively movable in a vertical direction with respect to each other.

15. The movement device of claim 12, wherein
the guide bar or the guide block is connected to the frame in such a way that the guide bar or the guide block is fixed to a guide frame and the guide frame is fixed to the frame.

16. The movement device of claim 12, wherein the in-wheel comprises:
   a rim which has a ring shape and outer circumference of which a tire is coupled to;
   a protrusion that is inwardly extended in an axial direction from the rim;
      an outer circumferential shaft which has a cylinder shape and faces inner circumference of the protrusion;
   a shaft which is extended in an axial direction at a center of a radial direction of the outer circumferential shaft; and
   a circular plate connecting the shaft and the outer circumferential shaft,
      wherein the supporting portion is inwardly disposed in a radial direction of the outer circumferential shaft.

* * * * *